(12) United States Patent
Wiley et al.

(10) Patent No.: US 7,555,677 B1
(45) Date of Patent: Jun. 30, 2009

(54) SYSTEM AND METHOD FOR DIAGNOSTIC TEST INNOVATION

(75) Inventors: Stephen A. Wiley, Arvada, CO (US); Jamie D. Riggs, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 572 days.

(21) Appl. No.: 11/112,053

(22) Filed: Apr. 22, 2005

(51) Int. Cl.
G06F 11/00 (2006.01)

(52) U.S. Cl. .................. 714/36; 713/1; 713/2; 714/47; 714/723

(58) Field of Classification Search .................. 714/36, 714/723, 47, 708; 713/2, 1
See application file for complete search history.

(56) References Cited

U.S. PATENT DOCUMENTS

| | | | | |
|---|---|---|---|---|
| 4,479,214 A | * | 10/1984 | Ryan | 714/702 |
| 4,584,681 A | * | 4/1986 | Singh et al. | 714/7 |
| 5,233,614 A | * | 8/1993 | Singh | 714/723 |
| 5,410,713 A | * | 4/1995 | White et al. | 713/330 |
| 5,469,394 A | * | 11/1995 | Kumakura et al. | 365/201 |
| 5,566,386 A | * | 10/1996 | Kumakura et al. | 365/226 |
| 5,748,877 A | | 5/1998 | Dollahite et al. | |
| 5,850,562 A | * | 12/1998 | Crump et al. | 713/1 |
| 5,974,546 A | * | 10/1999 | Anderson | 713/2 |
| 5,978,913 A | * | 11/1999 | Broyles et al. | 713/2 |
| 6,014,744 A | * | 1/2000 | McKaughan et al. | 713/2 |
| 6,216,226 B1 | * | 4/2001 | Agha et al. | 713/2 |
| 6,272,626 B1 | * | 8/2001 | Cobbett | 713/2 |
| 6,336,174 B1 | * | 1/2002 | Li et al. | 711/162 |
| 6,373,758 B1 | * | 4/2002 | Hughes et al. | 365/200 |
| 6,381,694 B1 | * | 4/2002 | Yen | 713/2 |
| 6,408,406 B1 | * | 6/2002 | Parris | 714/41 |
| 6,449,735 B1 | | 9/2002 | Edwards et al. | |
| 6,480,982 B1 | * | 11/2002 | Chan et al. | 714/764 |
| 6,487,464 B1 | * | 11/2002 | Martinez et al. | 700/79 |
| 6,598,159 B1 | * | 7/2003 | McAlister et al. | 713/2 |
| 6,640,316 B1 | * | 10/2003 | Martin et al. | 714/36 |
| 6,654,707 B2 | | 11/2003 | Wynn et al. | |
| 6,684,353 B1 | * | 1/2004 | Parker et al. | 714/718 |
| 6,691,252 B2 | * | 2/2004 | Hughes et al. | 714/30 |
| 6,715,067 B1 | * | 3/2004 | Rhoads et al. | 713/1 |
| 6,721,885 B1 | * | 4/2004 | Freeman et al. | 713/2 |
| 6,725,368 B1 | * | 4/2004 | Liebenow | 713/2 |
| 6,766,474 B2 | | 7/2004 | Schelling | |
| 6,807,643 B2 | * | 10/2004 | Eckardt et al. | 714/36 |

(Continued)

Primary Examiner—Robert Beausoliel
Assistant Examiner—Joshua P Lottich
(74) Attorney, Agent, or Firm—Kent A. Lembke; Libby A. Huskey; Marsh Fischmann & Breyfogle LLP

(57) ABSTRACT

A method and system for performing diagnostic testing to speed the computer boot process. A boot process is initiated and an error counter value is read in any of memory, input/output, central processing, networking, mass storage, or other computing subsystems. The error counter values are compared to subsystem error thresholds. The method includes identifying subsets of subsystems with error counters exceeding error thresholds and then, performing diagnostic tests only on this subset of subsystems as part of the boot process. The error counter may be a correctable error counter that is incremented by an operating system error handler as it isolates subsystem errors. The method includes identifying subsystems in service less than a predefined time threshold by comparing a value stored in a power-on hours field in each subsystem to time thresholds, and including these modules in the tested subset.

16 Claims, 4 Drawing Sheets

U.S. PATENT DOCUMENTS

| | | | |
|---|---|---|---|
| 6,839,867 B2 * | 1/2005 | Nunn et al. | 714/36 |
| 6,961,785 B1 * | 11/2005 | Arndt et al. | 710/9 |
| 6,983,362 B1 * | 1/2006 | Kidder et al. | 713/1 |
| 7,007,099 B1 * | 2/2006 | Donati et al. | 709/237 |
| 7,058,782 B2 * | 6/2006 | Henderson et al. | 711/170 |
| 7,062,517 B2 * | 6/2006 | Kodama | 707/204 |
| 7,089,461 B2 * | 8/2006 | Gilbert et al. | 714/47 |
| 7,093,115 B2 * | 8/2006 | Poisner et al. | 713/1 |
| 7,168,010 B2 * | 1/2007 | Yadavalli et al. | 714/42 |
| 7,177,782 B2 * | 2/2007 | Falik et al. | 702/189 |
| 7,188,239 B2 * | 3/2007 | Funayama | 713/2 |
| 7,200,770 B2 * | 4/2007 | Hartwell et al. | 714/7 |
| 7,219,261 B2 * | 5/2007 | Tada et al. | 714/15 |
| 7,269,764 B2 * | 9/2007 | Dart et al. | 714/54 |
| 7,302,594 B2 * | 11/2007 | Di Benedetto | 713/300 |
| RE40,092 E * | 2/2008 | Kang | 713/2 |
| 7,334,159 B1 * | 2/2008 | Callaghan | 714/30 |
| 7,340,593 B2 * | 3/2008 | Martin | 713/1 |
| 7,340,594 B2 * | 3/2008 | First et al. | 713/2 |
| 7,346,809 B2 * | 3/2008 | Blanchard et al. | 714/37 |
| 7,366,953 B2 * | 4/2008 | Huott et al. | 714/36 |
| 7,409,584 B2 * | 8/2008 | Denninghoff et al. | 714/6 |
| 2002/0016942 A1 * | 2/2002 | MacLaren et al. | 714/718 |
| 2002/0108073 A1 * | 8/2002 | Hughes | 714/7 |
| 2002/0120887 A1 * | 8/2002 | Hughes et al. | 714/42 |
| 2002/0184557 A1 * | 12/2002 | Hughes et al. | 714/8 |
| 2003/0110248 A1 * | 6/2003 | Ritche | 709/224 |
| 2003/0154426 A1 * | 8/2003 | Chow et al. | 714/30 |
| 2003/0154428 A1 * | 8/2003 | Pelner | 714/36 |
| 2003/0163765 A1 * | 8/2003 | Eckardt et al. | 714/36 |
| 2004/0030957 A1 * | 2/2004 | Yadavalli et al. | 714/30 |
| 2004/0158699 A1 * | 8/2004 | Rhoads et al. | 713/1 |
| 2004/0199830 A1 * | 10/2004 | Gilbert et al. | 714/47 |
| 2004/0215953 A1 * | 10/2004 | Cantwell et al. | 713/2 |
| 2005/0015581 A1 * | 1/2005 | Chen | 713/2 |
| 2005/0028039 A1 * | 2/2005 | Henderson et al. | 714/42 |
| 2005/0033952 A1 * | 2/2005 | Britson | 713/2 |
| 2005/0120265 A1 * | 6/2005 | Pline et al. | 714/7 |
| 2005/0283343 A1 * | 12/2005 | Cromer et al. | 702/189 |
| 2005/0283566 A1 * | 12/2005 | Callaghan | 711/104 |
| 2007/0245170 A1 * | 10/2007 | Crowell et al. | 714/36 |

* cited by examiner

SYSTEM AND METHOD FOR DIAGNOSTIC TEST INNOVATION

BACKGROUND OF THE INVENTION

1. Field of the Invention

The present invention relates, in general, to diagnostic testing of computer systems and more particularly, to an adaptive diagnostic testing method and associated systems for providing desired diagnostic functions in a computer or computer system while controlling or increasing the speed of system boot processes.

2. Relevant Background

The typical start up of a computer or computing system involves reading an operating system (OS) from disk and is often called a boot process or booting up a computer. Diagnostic testing is often performed as part of the boot process to identify potential problems with the computer system, but running these tests can significantly slow the boot process. As a result, computer owners and system administrators are continually struggling with the questions of when to take the time to run diagnostic tests, how long will it take to boot the system, and are diagnostic tests worth the increases in boot time. The technical service industry has struggled with these questions since computing devices first failed and required repair or since the initial use of computer systems.

Under existing practices, a computer operator or system administrator has to choose between booting their computer system quickly with no or very limited diagnostic testing or booting their system with some level of diagnostic testing that extends the time required for the boot process to complete. Typically, a boot with diagnostic testing is chosen when it is believed there may be faulty components within a system and there is a need to test, discover, and diagnose the related problems prior to operating the computer system. The choice to run diagnostic testing as part of the boot process is often controlled by an operator or administrator setting a variable indicating testing is to be performed and in some cases, choosing a desired diagnostic test level.

The amount of time required for the boot process for a computer system or "boot time" is affected by a number of factors or variables. For example, the amount or degree of test coverage that is selected or required in the execution of the diagnostic testing can significantly shorten or lengthen the boot time. Similarly, the number of diagnostic tests chosen for execution can affect boot time. The number of tests may also vary with the number of components in the computer system that require testing or that are specified for testing. In other words, the size of the system, the amount of memory, the number of central processing units (CPUs), the number of Field Replaceable Units (FRUs), and other component-related factors can affect the length of boot time. Similarly, the number of tests that are executed may vary with the number of diagnostic tests available for running against a specific system or subsystem (i.e., tests for CPUs, for memory, for I/O devices, and the like).

Even the procedure or way in which the diagnostic tests are executed changes the boot time. For example, the tests may be run sequentially or serially with one test not beginning until the completion of a prior test or the tests may be run with parallelism with at least some tests being run concurrently. Another major consideration in running diagnostic tests at boot time is that time required for each test to execute as such test execution time varies widely among known diagnostic tests. Test engineers attempt to achieve proper test coverage for a computer system by considering data patterns used in the system, command sequences employed, system addressing practices, and many other factors. The time to run certain diagnostic functions or tests are often extended when the system includes increased or significant amounts of memory.

Efforts to reduce the effect of diagnostic testing on boot time have often stressed trying to reduce the number of diagnostic tests that are available for running on a system or subsystem. Other efforts have emphasized the usefulness of reducing the amount of time each test takes to run or execute. These efforts to reduce boot time have not been entirely successful, and the computer industry continues to struggle with the use of the diagnostic testing strategy that assumes there may be an unknown fault or problem present somewhere in every computer system as this strategy requires that testing be used each time a system is booted to try to isolate or identify the potential fault.

There remains a need for an improved boot method that provides a different model for diagnostic testing and its deployment. Such a method preferably would provide adaptive, dynamic diagnostic testing requiring little or no human intervention and at least in some cases, would be applied automatically and when required rather than by default.

SUMMARY OF THE INVENTION

The present invention addresses the above and other problems by providing a method and corresponding systems of appropriate diagnostic testing for a computer or computer system during the boot process. The method and systems adjust the boot time for improved efficiencies for the diagnostic functionality that results in little or no loss in effective test coverage. Prior computer diagnostic approaches are based on the guiding concept of "looking for a problem to solve" which results in undue time delays to the boot process as areas of a system are tested even though failure is unlikely. In contrast, the present invention concentrates more on the decisions of when to execute selected diagnostic tests and to what degrees those selected tests have coverage in a computer system. This is achieved in part by providing an adaptive diagnostic testing method and system that is trying to solve problems that are known to exist and, when no problems are evident, testing to comply with any warranty-related requirements (or during a warranty or similar time period).

More particularly, a method is provided for selectively performing diagnostic testing during a boot process of a computer system. The method includes initiating a boot process and reading a value of an error counter stored in each of a plurality of memory modules. The values of the error counters are compared to an error threshold for the computer system. The method continues with identifying a subset of the memory modules for which the value of their error counter exceeds the error threshold, and then performing diagnostic tests only on the subset of memory modules as part of the boot process. The error counter may be a correctable error counter, which may be incremented by an operating system error handler that isolates errors for each memory module. The memory modules in one embodiment are each dual in-line memory modules (DIMMs) that are provided as field replaceable units (FRUs) in the computer system. The diagnostic tests may be performed at least in part in parallel fashion, such as on two or more memory modules concurrently or partially concurrently. The method may also include reading a power-on hours field in each memory module to determine whether the module has been in service longer than some predefined time threshold. The diagnostic tests are also performed on those modules that do not exceed the threshold (e.g., by adding such modules to the subset of modules to be tested), such that new or newly installed modules are tested.

According to another aspect of the invention, an adaptive diagnostic testing method is provided for use in booting a computer system. In this method, a diagnostic variable is stored in the memory of the computer system and is initially set as active or "ON" to indicate that diagnostic testing is appropriate. The method continues with initiating a boot process in the computer system and reading the diagnostic variable from system memory. When the diagnostic variable has an active setting, the method continues with performing the boot process including executing a set of diagnostic tests on the computer system. However, when the diagnostic variable has an inactive setting (such as during the next or later boot processes), the method continues with performing the boot process without executing the set of diagnostic tests. When a fault or error is not detected during the boot process, the method includes setting the diagnostic variable to the inactive or "OFF" setting. Then, a next boot process is performed by repeating the steps of the method discussed above beginning with the initiation of a system boot. The setting of the diagnostic variable may, for example, occur after loading of the operating system kernel but before the transfer of control to the kernel. The method may further include detecting a fault or error and in response, setting (or resetting) the diagnostic variable to the active or "ON" setting such that the diagnostic tests will be run on subsequent boots of the computer system.

DETAILED DESCRIPTION OF THE PREFERRED EMBODIMENTS

In brief, the present invention is directed to methods of better controlling the amount of time required for booting up or a boot process for a computer device or computer system. The methods of the present invention, and associated systems, generally include techniques for allowing a computer system to execute diagnostic testing in a selective or adaptive manner such as by running diagnostic testing only when faults or problems are historically present in the computer system, or during an initial time period of operation of one or more components in the computer system.

In the following discussion, computer and network devices, such as the software and hardware devices within the computer systems or devices, are described in relation to their function rather than as being limited to particular electronic devices and computer architectures and programming languages. To practice the invention, the computer systems or devices may be any devices useful for providing the described functions, including well-known data processing and communication devices and systems, such as application, database, web, blade, and entry level servers, midframe, midrange, and high-end servers, personal computers and computing devices including mobile computing and electronic devices with processing, memory, and input/output components and running code or programs in any useful programming language, and server devices configured to maintain and then transmit digital data over a wired or wireless communications network. Data storage systems and memory components are described herein generally and are intended to refer to nearly any device and media useful for storing digital data such as disk-based devices, their controllers or control systems, and any associated software.

Figure 1:
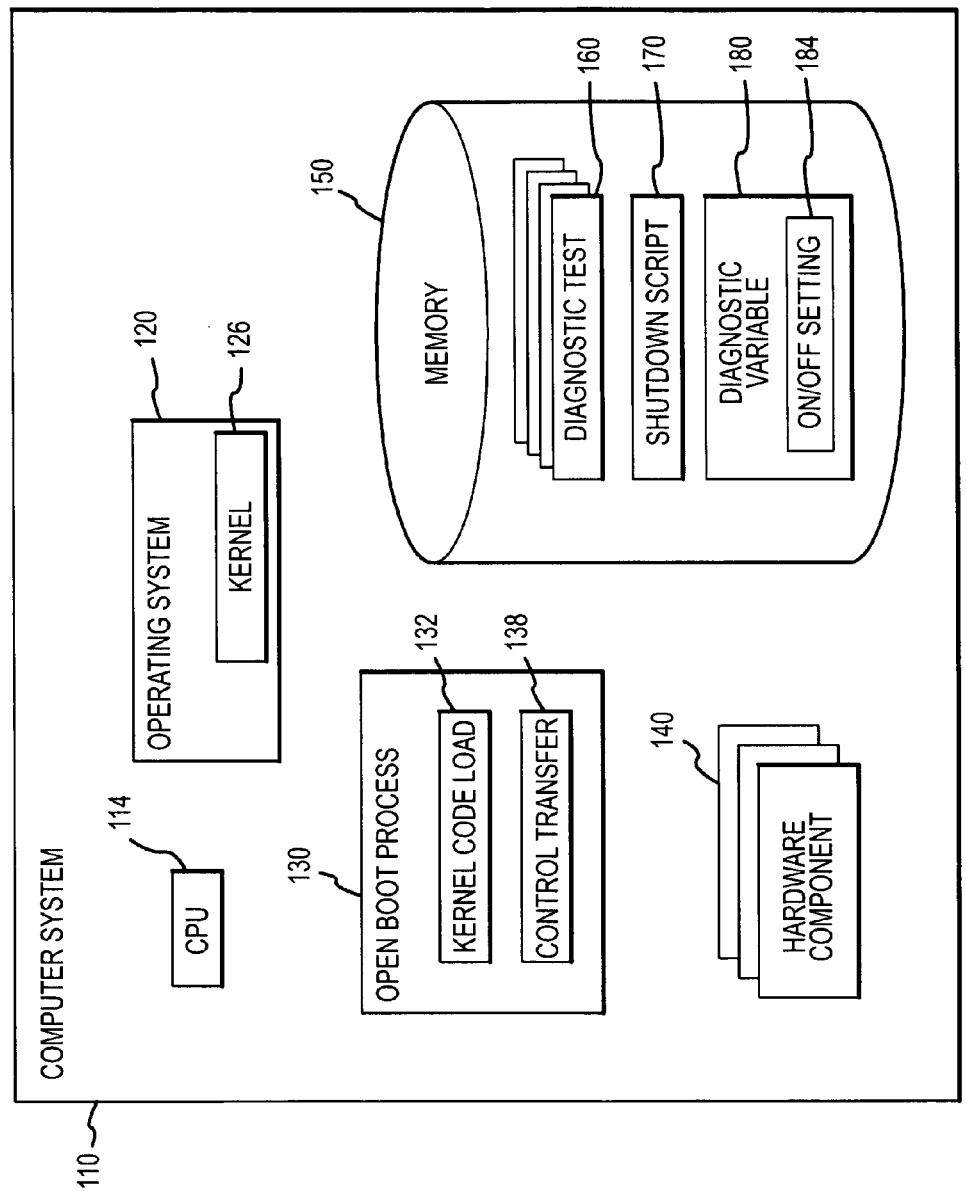
FIG. 1 illustrates a simplified computer system or device adapted for selective diagnostic testing during boot up according to the present invention.

FIG. 1 illustrates a simplified computer, computer device, or computer system 110 which may take on numerous configurations and arrangements to practice the invention and is intended to generally represent any device or system that undergoes a boot process such as at start up or power up. As shown, the computer system 110 includes a central processing unit (CPU) 114 that controls operation of the system 110 including loading and running an operating system 120 with a kernel (or OS kernel or kernel OS) 126. A bootstrap or open boot process 130 is provided in the system 110 (such as in Read Only Memory (ROM) not explicitly shown) to control the starting up of the computer system 110 and to place it in a desired operational state including reading and loading the operating system 120 and performing diagnostic testing of hardware components 140 and other portions of the system 110. The boot process 130 may include a kernel code load 132 portion and portion for transferring control 138 to the operating system 120.

Figure 2:
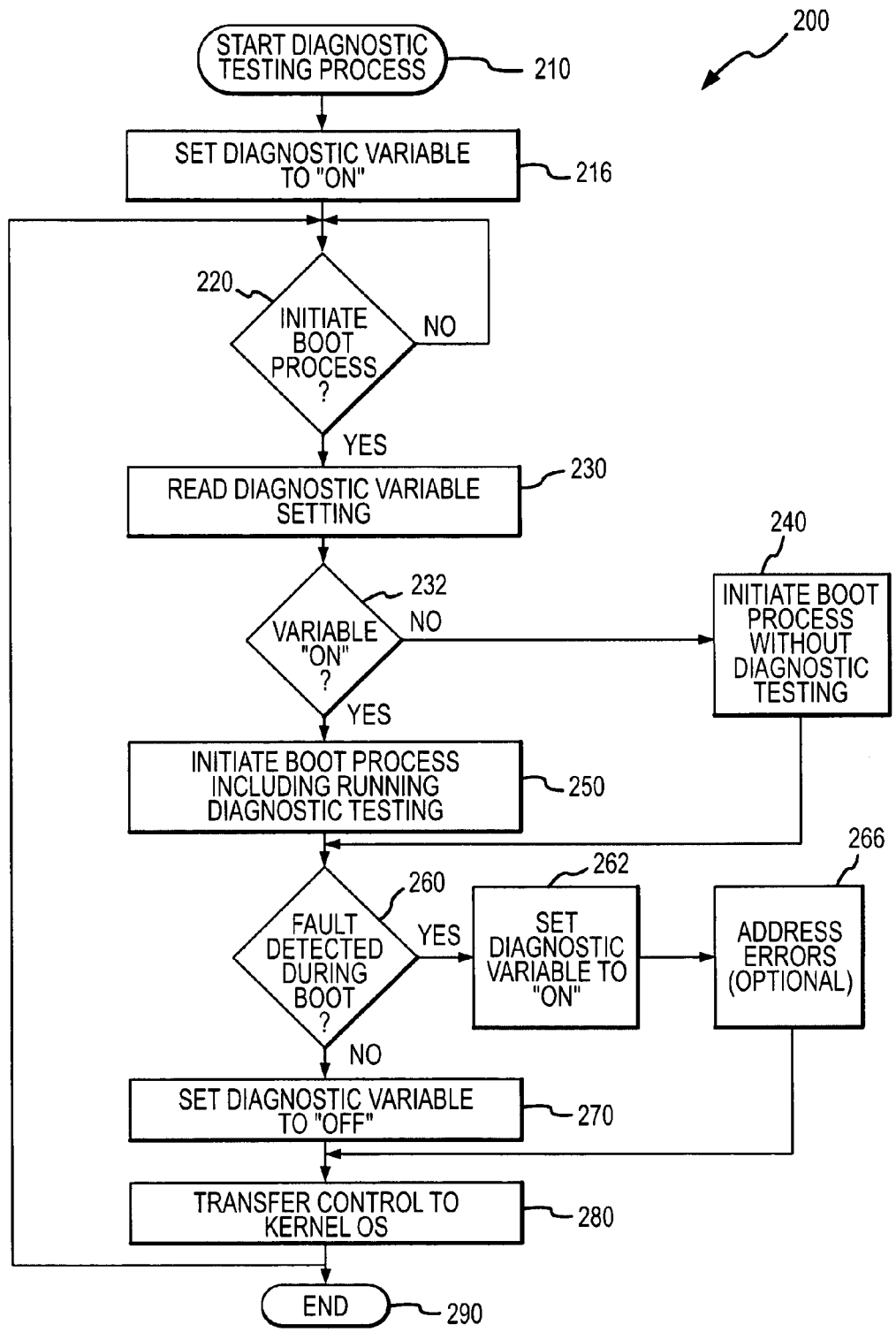
FIG. 2 illustrates an exemplary diagnostic testing process of the invention such as may be carried out during operation of the computer system of FIG. 1.

Memory 150 is provided in the system 110 (or as may be provided as a hardware component 140). One or more diagnostic tests 160 are provided in memory 150 and as explained with reference to FIG. 2, are selectively run by the open boot process 130 during boot up of the system 110. The particular tests 160 run by the system 110 is not limiting to the invention as the invention is directed more toward when the tests 160 are performed rather than which tests are performed. More particularly, the method of the invention provides a technique for dynamically making the decision of whether or not to execute diagnostics 160 as part of the boot process 130. The decision can be thought of as being dependent upon why the system 110 is booting or rebooting the operating system 120. For example, if the boot is a result of a hardware trap related to a hardware component 140 or is related to hardware fault handling, the open boot process 130 operates so as to cause the execution of the diagnostic tests 160 to provide maximum diagnostic test capability. However, at least typically, during normal start up or power on, the diagnostic tests 160 are not run unless new components are configured into the system.

To provide this adaptive diagnostic testing in the system 110 of FIG. 1, a modified shutdown script 170 is provided that controls (at least in some cases) the on/off setting 184 of a diagnostic variable 180, which is provided to enable the boot process 130 (or system 110) to determine when the diagnostic tests 160 should be run as part of the boot process 130. FIG. 2 illustrates exemplary processes and functions that may be carried out during a boot process or operation of the system 110 and is useful for explaining the use and/or function of each component in the system 110.

With reference to FIG. 2, an exemplary adaptive diagnostic testing process 200 of the present invention is illustrated that provides a way for limiting the times when diagnostic tests 160 are run as part of the boot process 130 to limit "unnecessary" hardware tests and other diagnostics and to speed up completion of the boot process 130 (at least on average over a number of boots and reboots of the system 110). In contrast, prior to the invention, the diagnostic tests 160 typically would be run every time the open boot process 130 is performed by the CPU 114.

The method 200 begins at 210 typically with providing a diagnostic variable 180 that can be set as "ON" or "OFF" by changing the value of the setting 184. For example, the variable 180 may be a bit in NVRAM that is available to the open boot process (OBP) 130 that is dynamic and enables diagnostic testing (or execution of the tests 160) when active or set "ON" such as by setting the bit to one ("1"). At 216, the method 200 continues with setting the diagnostic variable to "ON" or active, which may be considered a default mode or value so that the tests 160 are run by default. The step 216 may be performed when a system 110 is first operated or when new components are added or configured into the system 110.

Thereafter, step 220 is performed to determine when a new boot or reboot process is being initiated and if not, the step 220 is repeated. If initiated, the open boot process 130 is begun at 220 and at 230, the diagnostic variable setting 184 is read or determined. At 232, the method 200 continues with determining whether the diagnostic variable is ON or OFF (active or inactive). If the setting is "OFF" or inactive (e.g., the appropriate bit in NVRAM or the like is zero ("0")), the boot process 130 is begun such as by running the kernel code load 132 portion to load the kernel 126 without running the diagnostic tests 160 and the process continues at 260. If the setting is "ON", the method continues at 250 with initiating the boot process 130 including running the diagnostic tests 160 as an initial or early step in the boot process 130 (such as before the kernel code load 132 and/or the control transfer 138).

At 260, the method 200 continues with determining whether a fault, error, or other problem was detected during the boot process 130. If so, the diagnostic variable is set to "ON" or active (if not already set this way) at 262 and optionally, the errors or detected problems are addressed at 266. The method 200 continues at 280 with transfer of the control to the kernel 126. The method 200 ends at 290 or continues with another boot process 130 being initiated at 220. If no faults or problems are detected/noted at 260, the method 200 continues at 270 with setting the diagnostic variable 180 setting 184 to "OFF" or inactive (e.g., changing the bit in NVRAM to zero ("0"). At 280, the control is transferred by the control transfer module 138 to the kernel 126 and the method ends at 290 or continues at 220.

In the method 200, it can be seen that the setting or bit 184 is read to determine if diagnostic tests 160 are to be executed during the OBP 130. The bit or setting 184 is typically set when the OBP 130 (or OS 120) has completed running the load module 132 to load the kernel code 126 but typically, prior to transfer of control by module 138 to the kernel OS 126. If the system 110 panics or reboots due to a hardware 140 malfunction, the variable 180 setting 184 will be active or "ON" (e.g., set to one) and diagnostic tests 160 will be executed on subsequent boots or execution of the open boot process 130. If the system 110 is shut down via shutdown script(s) 170, the tests 160 are not run because the variable 180 setting 184 is "OFF" or inactive. To this end, the script 170 is configured or modified to turn or reset at 270 the variable 180 setting 184 to "OFF" or set the bit to zero to bypass diagnostic tests 160 on the next boot cycle or running of OBP 130. As will be appreciated, the method 200 can be implemented with relative ease but the diagnostic test process 200 provides dynamic adjustments so that time is not wasted on a normal power on and/or reboot after normal shutdown. This method 200 will likely significantly reduce boot process time for system 110 especially when a longer period of time is considered, such as the boot time required over several months or a year and if the system 110 has significant memory 140 or 150 and/or is booted frequently.

Figure 3:
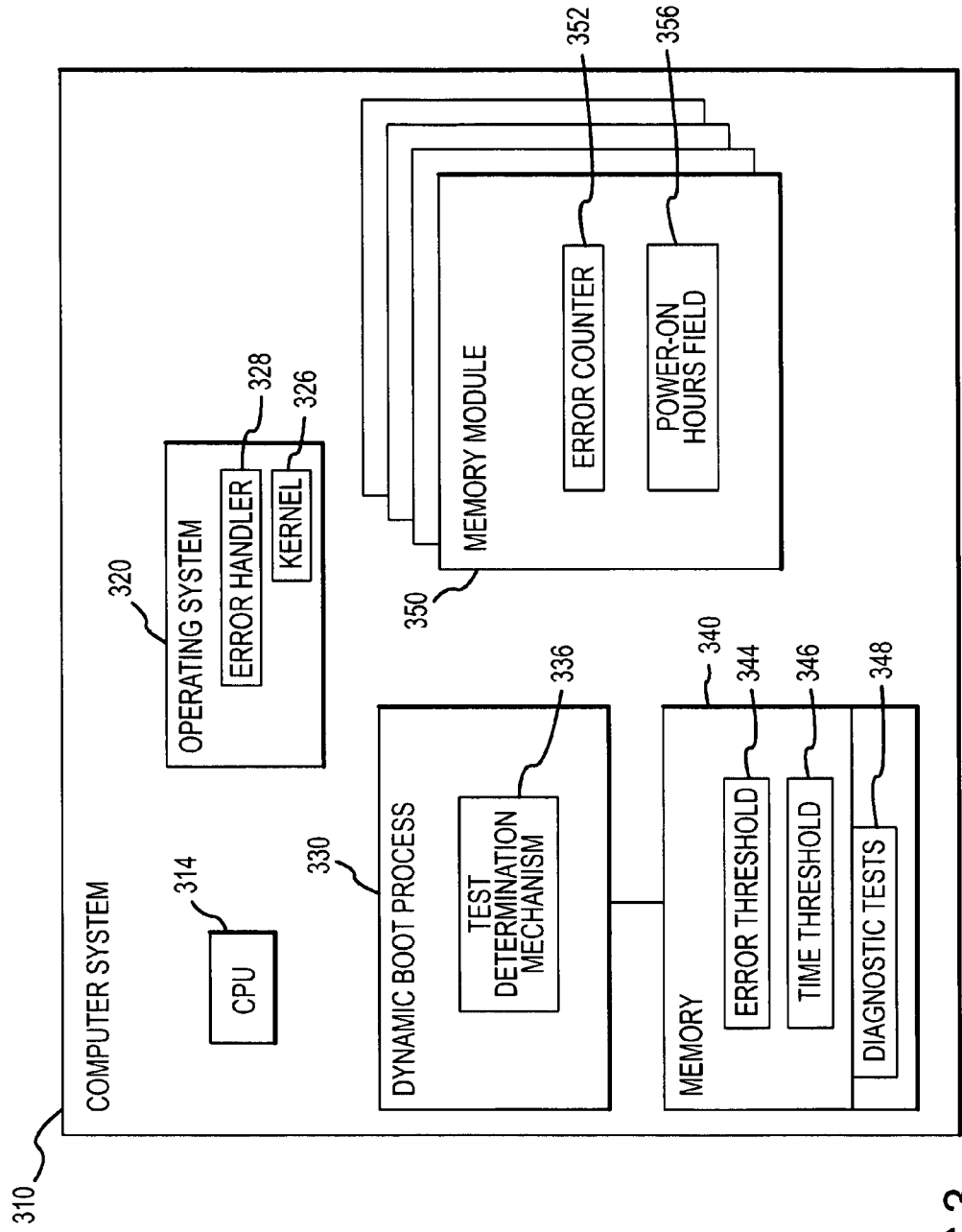
FIG. 3 illustrates another embodiment of a computer system configured for adaptive diagnostic testing during boot up according to the present invention.

FIG. 3 illustrates another preferred embodiment of a computer system 310 configured according to the invention to dynamically adjust test execution to support test coverage requirements of the system 110 and provides further reductions over the system 110 of FIG. 1. In other words, the features of the system 310 can be incorporated in the system 110 (or added to those features) to create a system (not shown) that is even more effective at controlling boot process time, with the system 310 being shown to allow different dynamic diagnostic test features to be explained more clearly (but not as a limitation).

As shown, the computer system 310 is configured similarly to the system 110 with a CPU 314 controlling operation of the system 310 including running an operating system 320, which includes an OS kernel 326 as well as an error handler 328. Additionally, the system 310 includes a dynamic boot process 330 that includes a test determination mechanism or module 336 for carrying out some of the functions of the invention that allow the time required to carry out the boot process 330 to be effectively controlled (as is explained in more detail with reference to FIG. 4). Memory 340 is accessible by the boot process 330 and stores an error threshold 344 and a time threshold 346 as well as a set of diagnostic tests 348. The thresholds 344, 346 are used by the test determination mechanism 336 for determining when the diagnostic tests 348 should be run on a particular component of the computer system 310, i.e., the tests 348 preferably not run during each execution of the boot process 330 but instead only when indicated as required based on historical errors or to obtain testing during the initial use of a new component.

The system 310 provides a specific example in which diagnostic tests 348 are selectively run on memory components, and particularly, on memory modules 350. The memory modules 350 may take many forms to practice the invention. For example, the memory modules 350 may be installed as a memory bank and each module 350 may be a Field Replaceable Unit (FRU) that is provided in the form of a SIMM (single in-line memory module), a DIMM (dual in-line memory module), or the like.

According to one important feature of this embodiment of the invention, each memory module 350 is configured to store heuristics related to their own operation that can be used by the test determination mechanism 336 to determine whether diagnostics 348 are to be run on that particular memory module 350. Specifically, the module 350 is shown to include an error counter 352 and a power-on hours field 356 for storing operational heuristics, and more particularly, for storing a history of correctable errors (CEs) and the hours of operation of the module, respectively. During operation, the test determination mechanism 336 reads the data in these two heuristic storage elements 352, 356 and compares the data to the error threshold 344 and the time threshold 346 to determine whether the diagnostic tests 348 should be run on the module 350 (as is explained with reference to FIG. 4).

Figure 4:
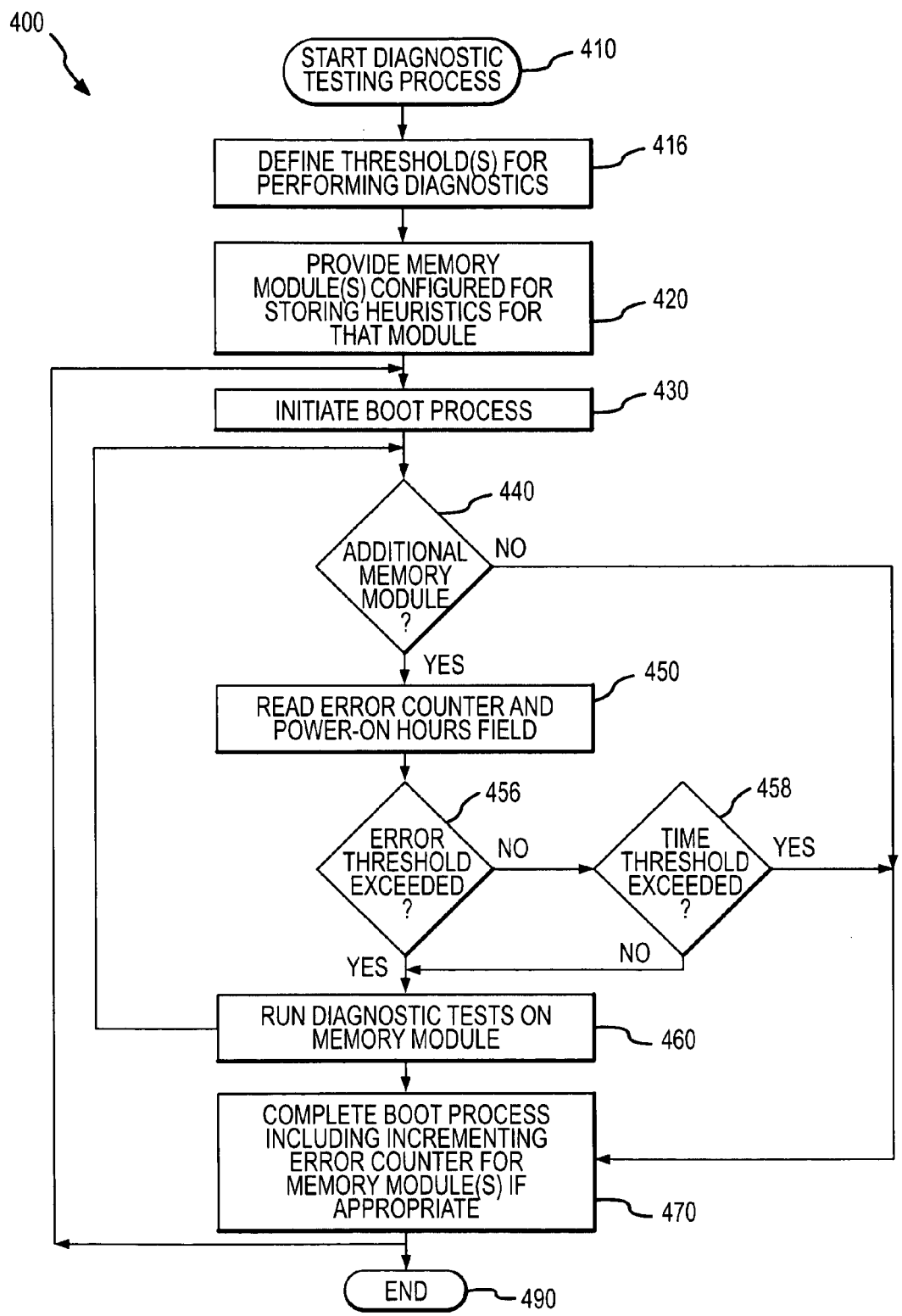
FIG. 4 is a flow diagram of an exemplary method of diagnostic testing process of the invention such as may be performed during operation of the computer system of FIG. 3.

FIG. 4 shows an exemplary diagnostic testing process 400 that may be carried out by operation of the computer system 310. The method 400 starts at 410 typically with providing a dynamic boot process 330 in the computer system 310 with the test determination mechanism 336 or at least configured to perform the steps of reading the error counter 352 and power-on hours field 356 of each module 350 and for comparing these values to thresholds 344, 346 to determine if diagnostic tests 348 are to be run on one or more of the modules 350.

The method 400 continues at 416 with defining thresholds 344, 346 for use in determining when to run the set of diagnostic tests 348 for a particular memory module 350. The error threshold 344 defines how many historical errors or faults can be identified for a module 350 before tests 348 are required. For example, the threshold 344 may be used to define how many prior correctable errors (CEs) can be identified for the module 350 prior to running the tests 348 during the next boot process 330 (e.g., 1, 2, 3 or more). The time threshold 346 can be used to set a period of time for which new or newly installed components are tested (such as warranty period or the like), e.g., tests 348 are run at each boot up for memory modules 350 for the first 10 to 40 days (i.e., 240 to 960 hours) or some other useful time period. Once such a time period has expired, the tests 348 are only run for the module 350 during execution of the boot process 330 when the error threshold 344 is exceeded by the value stored in the error counter 352.

The method 400 continues at 420 with providing memory module(s) 350 each configured for storing heuristics regarding the operation of that module in the module itself. In the embodiment shown in FIG. 3, these heuristics are previously detected errors or correctable errors (CEs) that are tracked in counter 352 and hours that the module has been in use or powered up as tracked in the power-on hours field 356. At 430, the boot process 330 is initiated, such as power on of the system 310.

At 440, the method 400 continues with the test determination mechanism 336 determining whether there are memory modules 350 installed in the system 310 that have not been checked to determine if tests 348 should be run. If not, the boot process 470 is completed, which may include incrementing the error counter 352 such as when error handler 328 determines that correctable errors associated with the module 350 have been encountered. The method 400 then continues with a next boot process at 430 or ends at 490.

If an additional module 350 is detected at 440, then the method 400 continues with reading the error counter 352 and the power-on hours field 356. At 456, the test determination mechanism 336 compares the read value for the error counter 352 with the error threshold 344 to determine if the threshold is exceeded (or in some cases matched). If so, the method 400 continues at 460 with running the diagnostic tests 348 on the memory module 350 corresponding to the read error counter 352. In the illustrated process 400, step 440 is repeated after 460 is completed to look for additional memory modules 350 in system 310. In other embodiments, however, the tests 348 may be run in parallel on all or a subset of all memory modules 350 determined to either exceed the error threshold 344 or to not exceed the time threshold 346 (e.g., be within a warranty period or newly installed time period or the like). Such parallelism of testing is useful for further increasing the speed of the boot process 330. If the error threshold 344 is found to not be exceeded at 456, the method 400 may continue at 458 with determination by the test determination mechanism 336 of whether the read power-on hours value from field 356 exceeds (or in some cases, matches) the predefined time threshold 346 stored in memory 340. If the time threshold 346 is exceeded, the boot process 330 is completed at 470. If not exceeded, step 460 is performed to run the diagnostic tests 348 on the memory module 350 corresponding to the memory module 350 and the process 400 continues at 440. Again, in some embodiments, step 460 may be run after all or a number of modules 350 have been identified to allow testing in parallel rather than relying on pure serial testing of two or more of the modules 350.

With this general understanding of the computer system 310 and its operation 400, it may now be useful to discuss a more specific implementation of the invention. The invention dynamically adjusts test execution to support the test coverage requirements of the system 310 and reduces time from the boot budget. The specific intent in one implementation of the system 310 is to execute memory tests 348 on memory banks 350 that have a history of correctable errors (CEs), and no tests 348 are executed on memory banks 350 that do not have a history of CEs. In one such implementation, the memory banks or modules 350 are DIMMs and heuristics regarding CEs are stored in the memory DIMMs 350 themselves such as a part of a dynamic FRUID EEPROM statistic (e.g., one byte in size or some other useful size), which is represented as error counter 352 in FIG. 3.

In practice, CEs can be isolated to individual DIMMs 350 by either a service controller (not shown) in system 310 or the operating system's CE error handler 328, such as with the use of single bit error syndrome analysis. Then, the appropriate or corresponding DIMM's FRUID CE error counter 352 is incremented with each CE detected as part of the isolation process. Memory DIMMs 350 installed in any memory bank exceeding a predefined threshold 344 are tested by the memory diagnostic tests 348 during boot 330.

If a DIMM is replaced with a new DIMM 350 or a new DIMM 350 (e.g., a new FRU) is installed in the system 310 (e.g., one that has no CE counter increments in counter 352), the memory 350 is tested (if the system 310 is booted within the time threshold 346) within a predefined time threshold stored at 346 in memory. For example, a DIMM 350 may be tested during each boot 330 during the next 30 days of operation, such as for infant mortality-type fault modes. To provide such time-based, adaptive testing, one embodiment utilizes the FRUID "power-on hours" field 356, which is an interface provided in many server products. Memory DIMMs 350 that have values in the power-on hours field 356 (or power-on hours) that are less than or equal to 30 days (or some other period of time) as determined by the test determination mechanism 336 receive test coverage with tests 348 when the system 310 is booted with boot process 330. This time dependent portion of the adaptive diagnostic testing method of the invention accounts for both newly added memories 350 installed to expand memory capacity in the system 310 as well as for new memories 350 that were installed to replace older DIMMs that were removed from system 310.

The inventor has noted in Error Correction Code (ECC) studies that only a relatively small percentage of DIMMs ever actually receive CEs. However, this should not be construed as a small number of DIMMs overall as the total number of installed DIMMs is very large and hence, the number of DIMMs having CEs is a relatively large number. However, requiring testing of only the DIMMs receiving CEs significantly reduces the boot time for many computer systems (e.g., servers and the like using DIMMs, other FRUs, and the like). The distribution of the DIMMs that have CEs is random and cannot be readily predicted within the population of computer systems. However, the number of DIMMs requiring testing based on determination of CEs over a threshold limit will likely be small for each individual system 310 and many systems will have no DIMMs with CE counts exceeding the error threshold. Hence, the boot time for systems 310 implementing the technique of running tests 348 based on historical errors will be much lower than for those that test all DIMMs regardless of their historical performance.

The error and time based schemes discussed relative to system 310 of FIG. 3 can also be applied to other components in addition to memory modules. The methods can be used, for example, in a repair depot and used to validate diagnosis engine isolations by using the component health status (CHS) or other statistic written in FRUID of the part under test (rather than the CE error counter). FRUs that have CHS marked as "faulty" can be tested thoroughly with the use of other fault management codes stored within the FRUID to adapt the diagnostic/FRU repair process behavior and automatically target and concentrate in the areas of interest. Such use of the CHS to concentrate testing can rapidly isolate faults without wasting valuable test time by applying tests to non-faulty portions of the FRU that would not likely fail. Additionally, local machines can be adapted to ignore testing of the already identified faulty FRUs if they are not to be integrated back into the system.

Boot policies can be established based all or in part upon CHS statistical analysis. Boot algorithms may be adjusted for reduced boot times as the result of these policies. The algorithms can run specific diagnostics based upon, e.g.: FRU and component times to fail (or inversely, Faults In Time, or FITs); random test sampling for failure mode analysis; boot time degradation characteristics; the need to identify components that may be suspected of, or are actually known to have, manufacturing defects; system-failure risk assessment requirements; and product reliability prediction requirements.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The system and method of the invention provides diagnostic test adaptation to any specified FRU, and this test adaptation can be accomplished whether or not the FRU is moved or what system the FRU may be in. Typically, new devices such as memories receive full diagnostic treatment because of the time dependent algorithms of the invention, but the systems they are installed within automatically adapt their diagnostic testing overtime to shorten their boot times when the time thresholds are exceeded. Then, the new devices require no testing during the boot process until they start exhibiting some threshold number of problems. Hence, the present invention eliminates the need for a system administrator or operator to choose between the extremes of having as short of boot time as possible and running diagnostic tests on all devices for each boot process, which results in extended boot times. The invention results in maintained confidence in hardware states through selective diagnostic testing while decreasing system boot time.

We claim:

1. A method for performing selective diagnostic testing during a boot of a computer system, comprising:
   initiating a boot process in the computer system;
   reading a value of an error counter stored in each of a plurality of memory modules during the boot process;
   comparing the value of each read error counter to an error threshold for the computer system during the boot process;
   determining a subset of the memory modules for which the value of each read error counter exceeds the error threshold during the boot process; and
   performing diagnostic tests on the subset of the memory modules during the boot process.

2. The method of claim 1, wherein the diagnostic tests are not performed on the memory modules that are not members of the subset of the memory modules.

3. The method of claim 1, wherein the value of the error counter for each of the memory modules represents a count of correctable errors for the memory module corresponding to the error counter.

4. The method of claim 1, wherein each of the memory modules comprises a dual in-line memory module (DIMM).

5. The method of claim 1, wherein at least a portion of the diagnostic tests are performed in parallel.

6. The method of claim 1, further comprising reading a value of a power-on field in each of the memory modules to determine a length of a power on time period for each of the memory modules, comparing the determined length for each of the memory modules to a time threshold for the computer system, and when the determined length does not exceed the time threshold for early life failures, adding the memory module corresponding to the subset of the memory modules to be tested by the diagnostic tests.

7. The method of claim 1, further comprising after the initiating of the boot process, determining whether a diagnostic variable is set to indicate diagnostic testing is to be performed for the computer system and when determined to be set for such indication, performing a set of diagnostics on the computer system.

8. The method of claim 7, wherein the diagnostic variable is set by operation of a shutdown script run during shutdown of the computer system and wherein the set of diagnostics are not run on the computer system when the diagnostic variable is not set to indicate diagnostic testing.

9. A computer system configured for adaptive diagnostic testing to speed boot times, comprising:
   a processor running a boot process to set a state of the computer system and executing a set of diagnostic tests during the boot process;
   memory storing a threshold value; and
   a plurality of memory modules, wherein each of the memory modules includes an error counter that stores a diagnostic value, and wherein the boot process compares each of the diagnostic values to the threshold value, determines a subset of the memory modules for which each of the diagnostic values exceeds the threshold value, and runs the set of diagnostic tests on the subset of the memory modules.

10. The system of claim 9, wherein the diagnostic value is a count of correctable errors.

11. The system of claim 10, wherein the count for the correctable errors is incremented by an error handler of an operating system or by other online diagnostic techniques run by the processor of the computer system.

12. The system of claim 9, wherein the diagnostic value further comprises a power-on time for the memory module, and wherein the set of diagnostic tests are run on the subset of memory modules for which each of the power-on times does not exceed the threshold value.

13. The system of claim 9, wherein each of the memory modules is a dual in-line memory module (DIMM) and the diagnostic variable is stored in a persistently stored error counter of the DIMM.

14. An adaptive diagnostic testing method for booting computer systems, comprising:
   storing a diagnostic variable in memory of the computer system;
   setting the diagnostic variable as active;
   initiating a boot process in the computer system, wherein the boot process includes loading an operating system;
   when the diagnostic variable has an active setting, reading a value of an error counter stored in each of a plurality of memory modules during the boot process;
   comparing the value of each read error counter to an error threshold for the computer system during the boot process;

determining a subset of the memory modules for which the value of each read error counter exceeds the error threshold during the boot process;

performing a memory diagnostic test on the subset of the memory modules during the boot process;

when the diagnostic variable has an inactive setting, performing the boot process without executing the set of diagnostic tests on the computer system;

when a fault or error is detected during the boot process, setting the diagnostic variable to the active setting;

when a fault or error is not detected during the boot process, setting the diagnostic variable to the inactive setting; and performing a next boot process by repeating the initiating of the boot process, the reading of the diagnostic variable, the performing of the boot process, and the setting of the diagnostic variable.

15. The method of claim 14, wherein the setting of the diagnostic variable to the inactive setting is performed after loading of an operating system kernel on the computer system and before transferring control to the kernel.

16. The method of claim 14, wherein the value of the error counter for the memory module represents a count of correctable errors for the memory module.

* * * * *